United States Patent
Carter et al.

(10) Patent No.: US 10,197,020 B2
(45) Date of Patent: Feb. 5, 2019

(54) ELECTRICALLY DRIVEN COMPRESSOR-EXPANDER FOR A TURBOCHARGED ENGINE SYSTEM AND ASSOCIATED FLOW CONTROL VALVES

(71) Applicant: BorgWarner Inc., Auburn Hills, MI (US)

(72) Inventors: Jeffrey Carter, Mirfield (GB); Keith Nickson, Huddersfield (GB)

(73) Assignee: BorgWarner Inc., Auburn Hills, MI (US)

( * ) Notice: Subject to any disclaimer, the term of this patent is extended or adjusted under 35 U.S.C. 154(b) by 334 days.

(21) Appl. No.: 14/983,889

(22) Filed: Dec. 30, 2015

(65) Prior Publication Data
US 2016/0195047 A1    Jul. 7, 2016

Related U.S. Application Data

(60) Provisional application No. 62/099,622, filed on Jan. 5, 2015.

(51) Int. Cl.
F02B 33/44 (2006.01)
F02M 35/10 (2006.01)
(Continued)

(52) U.S. Cl.
CPC ....... F02M 35/10157 (2013.01); F02B 37/04 (2013.01); F02B 39/10 (2013.01);
(Continued)

(58) Field of Classification Search
CPC .... F02B 37/001; F02B 37/004; F02B 37/007; F02B 37/013; F02B 37/04; F02B 37/24; F02B 37/10; F02B 39/10
(Continued)

(56) References Cited

U.S. PATENT DOCUMENTS

2006/0091676 A1  5/2006 Ferraro
2007/0044470 A1  3/2007 Sumser et al.

FOREIGN PATENT DOCUMENTS

DE    202015102248 U1    5/2015
EP         0352064 A1 *  1/1990 ............ F02B 37/013
(Continued)

OTHER PUBLICATIONS

GB Search Report dated Jun. 16, 2016; Application No. GB1522820.8; Applicant: BorgWarner Inc.; 5 pages.
(Continued)

*Primary Examiner* — Ngoc T Nguyen
(74) *Attorney, Agent, or Firm* — BrooksGroup (57) ABSTRACT

An engine system (40) includes an engine (42), and a turbocharger (1) that receives exhaust gas from the engine (42) and delivers charged air to the engine (42). The engine system (40) also includes an electrically-driven compressor-expander (60) disposed in the engine air intake passage (48) between a compressor section (10) of the turbocharger (1) and the engine (42). The compressor-expander (60) is configured to modify the pressure and temperature characteristics of the charged air flow exiting the turbocharger compressor section (10). A valve (50) controls the flow path and/or direction of the charged air flow as it enters the compressor-expander (60).

12 Claims, 7 Drawing Sheets (51) Int. Cl.
    *F02M 31/20* (2006.01)
    *F02B 37/04* (2006.01)
    *F02B 39/10* (2006.01)
    *F02D 9/02* (2006.01)

(52) U.S. Cl.
    CPC ...... *F02M 31/20* (2013.01); *F02M 35/10255* (2013.01); *F02D 2009/0283* (2013.01); *Y02T 10/126* (2013.01); *Y02T 10/144* (2013.01)

(58) Field of Classification Search
    USPC .......................................... 60/612; 123/562
    See application file for complete search history.

(56) References Cited

FOREIGN PATENT DOCUMENTS

| | | | | |
|---|---|---|---|---|
| JP | 2007077854 A | 3/2007 | | |
| WO | WO 2012057191 A1 * | 5/2012 | ............ | F02B 37/013 |
| WO | 2014195070 A1 | 12/2014 | | |
| WO | 2016058739 A1 | 4/2016 | | |
| WO | 2016083004 A1 | 6/2016 | | |

OTHER PUBLICATIONS

C D Whelan et al.; Design and development of a turbo-expander for charge air cooling. pp. 459-470.
A. Romagnoli et al.; Assessment of supercharging boosting component for heavily downsized gasoline engines. pp. 13-26.

* cited by examiner

ELECTRICALLY DRIVEN COMPRESSOR-EXPANDER FOR A TURBOCHARGED ENGINE SYSTEM AND ASSOCIATED FLOW CONTROL VALVES

CROSS-REFERENCE TO RELATED APPLICATIONS

This application claims priority to and all the benefits of U.S. Provisional Application No. 62/099,622, filed on Jan. 5, 2015, and entitled "Electrically Driven Compressor-Expander For A Turbocharged Engine System And Associated Flow Control Valves", which is incorporated herein by reference

FIELD OF THE INVENTION

This invention relates to a turbocharged engine system, and in particular to a turbocharged engine system including an electrically driven compressor-expander.

BACKGROUND

Internal combustion engines, and particularly "downsized" engines, require high-pressure at the air intake to the engine cylinders. A turbocharger is a type of forced induction system used with internal combustion engines. Turbochargers deliver compressed air to an engine intake, allowing more fuel to be combusted, thus boosting the horsepower of the engine without significantly increasing engine weight. Thus, turbochargers permit the use of smaller engines that develop the same amount of horsepower as larger, normally aspirated engines. Using a smaller engine in a vehicle has the desired effect of decreasing the mass of the vehicle, increasing performance, and enhancing fuel economy. Moreover, the use of turbochargers permits more complete combustion of the fuel delivered to the engine, which in turn reduces undesirable engine emissions.

However, pressurizing the intake air raises its temperature, which reduces charge density, thereby reducing the advantage of a pressurized air intake. High charge temperature is also known to increase emissions of nitrous oxides from the engine. For these reasons, it is desirable to reduce the temperature of the charged intake air.

Engine systems may employ variable valve timing in which the timing of the movement of the engine cylinder valves is controlled and varies based on engine operating conditions. For example, a valve timing scheme referred to as "Miller timing," in which the air intake valve closes after the piston passes bottom dead center, can be used at high engine loads, and normal timing, in which the air intake valve closes when the piston is bottom dead center, can be used at partial engine load conditions. As a result, there is a need to control the pressure and temperature characteristics of the engine air intake over an even wider range.

SUMMARY

In some aspects, an engine system includes a turbocharger, a compressor-expander and a valve. The turbocharger includes a turbine section connected to an exhaust gas passage of an engine, and a compressor section connected to an air intake passage of an engine. The compressor-expander is disposed in the air intake passage at a location between the compressor section and an air intake of the engine. The valve is disposed in the air intake passage at a location between the compressor section and the compressor-expander, and is movable between a first valve operating state and a second valve operating state and configured to control air flow from the compressor section. The compressor-expander is switchable between a first operating mode in which the valve is in a first operating state and the air flow passing through the compressor-expander is expanded, and a second operating mode in which the valve is in the second operating state and the air flow through the compressor-expander is compressed.

The engine system may include one or more of the following features: a compressor-expander which is switched to the first operating mode when the engine is operating in a first power range, and is switched to the second operating mode when the engine is operating in a second power range, where the second power range is higher than the first power range; a compressor-expander including a housing that defines a portion of the air intake passage, a wheel disposed in the housing, and a rotating electric machine having an output shaft connected to the wheel; wherein the wheel has a shape that is optimized for efficient performance of both compression and expansion; and a valve which is a reversing control valve operable to change a direction of the air flow through the housing, and when the valve is in the first operating state, the air flow flows in a first direction, and when the valve is in the second operating state, the air flow flows in a second direction that is opposed to the first direction.

The engine system may also include one or more of the following additional features: a valve which is operable to switch a flow of air between a first path through the compressor-expander in which the flow of air is expanded, and a second path through the compressor-expander in which the flow of air is compressed; when the valve is in the first operating state, the wheel rotates in a first direction, and when the valve is in the second operating state, the wheel rotates in a second direction that is opposed to the first direction; a compressor-expander including an expander device having an expander wheel; a compressor device including a compressor wheel, and a rotating electric machine having an output shaft connected to both the expander wheel and the compressor wheel; when the valve is in the first operating state, the valve directs the air flow to the expander device via a first path, and when the valve is in the second operating state, the valve directs the air flow to the compressor device via a second path; the rotating electric machine is operable as a motor and as a generator; the compressor-expander includes an expander device including an expander wheel, a compressor device including a compressor wheel, a first rotating electric machine operable as a generator and having a first output shaft connected to the expander wheel, and a second rotating electrical machine operable as a motor and having a second output shaft connected to the compressor wheel; when the valve is in the first operating state, the valve directs the air flow to the expander device via a first path, and when the valve is in the second operating state, the valve directs the air flow to the compressor device via a second path; the engine system includes an aftercooler disposed in the air intake passage between the compressor section and the valve; and the engine system includes a bypass passage that connects the valve to the engine air intake and bypasses the compressor-expander.

In some aspects, an engine system includes a turbocharger that receives exhaust gas from an engine and provides charged (e.g., pressurized) air to the air inlet of the engine. The engine system includes a compressor-expander disposed in the charged air path between the turbocharger compressor and the engine air intake, and an air flow control valve in the charged air path between the turbocharger compressor and the compressor-expander. The compressor-expander is configured to modify the pressure and temperature characteristics of the charged air flow exiting the turbocharger compressor section. The engine system may optionally further include an aftercooler disposed in the pressurized air path between the turbocharger compressor and the valve. Based on engine load, the compressor-expander can be switched between operating as a compressor to provide additional air compression at high engine loads and operating as an expander to cool the charge air and recover power at lower engine loads.

Since the compressor-expander is disposed in the engine system between the turbocharger and the engine air intake, the compressor-expander can be operated as an expander to cool the charged air before it reaches the engine air intake, whereby the charged air entering the engine air intake has increased charge density relative to some conventional turbocharged engine systems in which the charged air temperature is reduced by other methods. For example, although some turbocharged engine systems employ an aftercooler in the form of a water-cooled heat exchanger in the charged air path downstream of the turbocharger compressor, there are practical limitations on the size and efficiency of the aftercooler and control of ambient air temperature that present a limit to the amount of cooling achieved by the aftercooler. In another example, control of the timing of the engine cylinder valves (e.g., Miller timing) is used to reduce the in-cylinder compression and therefore the combustion temperature. However, at partial engine loading conditions, Miller timing can result in a high level of particulate generation, and thus undesirable emissions.

In some embodiments, the turbocharged engine system includes an electrically driven compressor-expander disposed in the charged air path between the turbocharger compressor and the engine air intake, and an air flow control valve in the charged air path between the turbocharger compressor and the compressor-expander. Advantageously, use of the electrically driven compressor-expander permits the charged air to be either further compressed or expanded, depending on the operating conditions of the engine. In addition, use of the electrically driven compressor-expander permits accurate control over the amount of expansion or compression, and thus the ability to achieve the optimum compromise between charge pressure and temperature. This can be compared to some proposed supercharged engine systems that include an expander in the air intake passage (for example, a screw type expander), since use of a screw-type expander requires a variable ratio transmission between the engine and the expander to control the amount of expansion. Such mechanically driven systems may be inefficient, and relatively complex and expensive to implement when compared to the disclosed engine system.

BRIEF DESCRIPTION OF THE DRAWINGS

The present invention is illustrated by way of example and not limitation in the accompanying drawings in which like reference numbers indicate similar parts, and in which.

DETAILED DESCRIPTION

Figure 1:
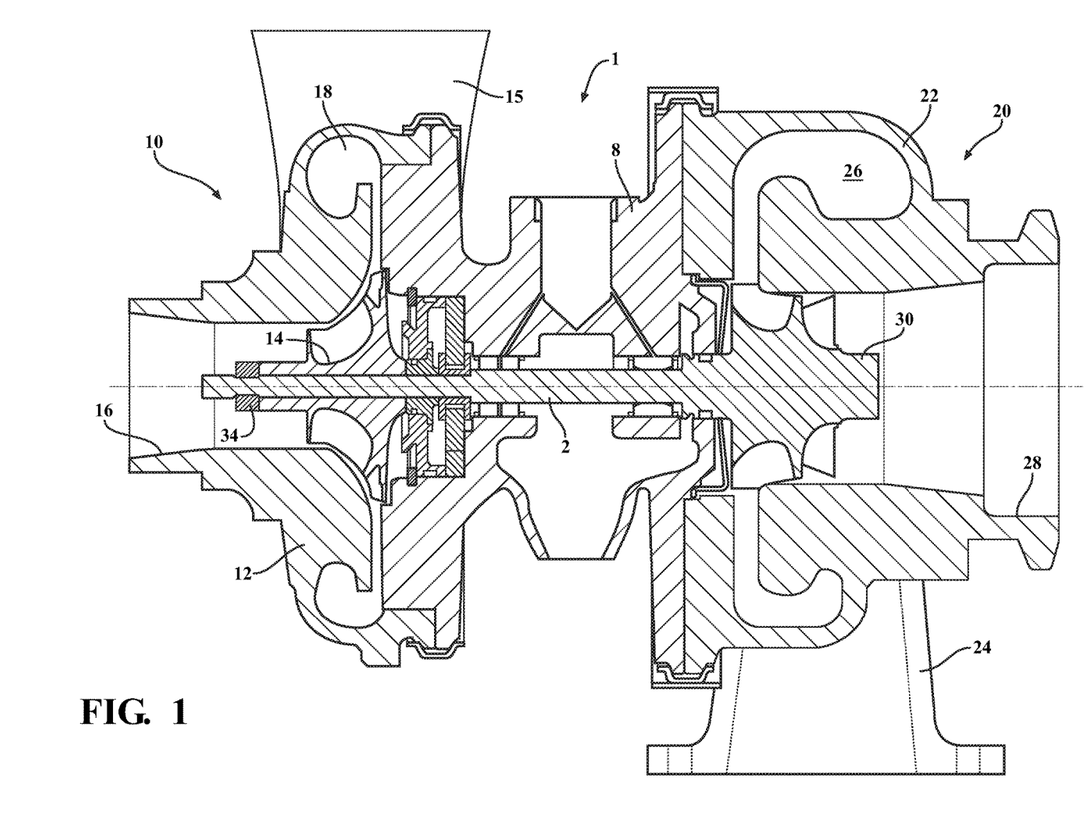
FIG. 1 is a cross-sectional view of an exhaust gas turbocharger.

Referring to FIG. 1, an exhaust gas turbocharger 1 includes a compressor section 10, a turbine section 20, and a bearing housing 8 disposed between and connecting the compressor section 10 to the turbine section 20. The turbine section 20 includes a turbine housing 22 that defines an exhaust gas inlet 24, an exhaust gas outlet 28, and a turbine volute 26 disposed in the fluid path between the exhaust gas inlet 24 and exhaust gas outlet 28. A turbine wheel 30 is disposed in the turbine housing 22 between the turbine volute 26 and the exhaust gas outlet 28. The turbine wheel 30 is fixed to a shaft 2. The shaft 2 is rotatably supported within in the bearing housing 8, and extends into the compressor section 10. The compressor section 10 includes a compressor cover 12 that defines an air inlet 16, an air outlet 15, and a compressor volute 18. A compressor impeller 14 is disposed in the compressor cover 12 between the air inlet 16 and the compressor volute 18. The compressor impeller 14 is disposed on an opposed end of the shaft 2, and secured thereto by a nut 34.

Figure 2:
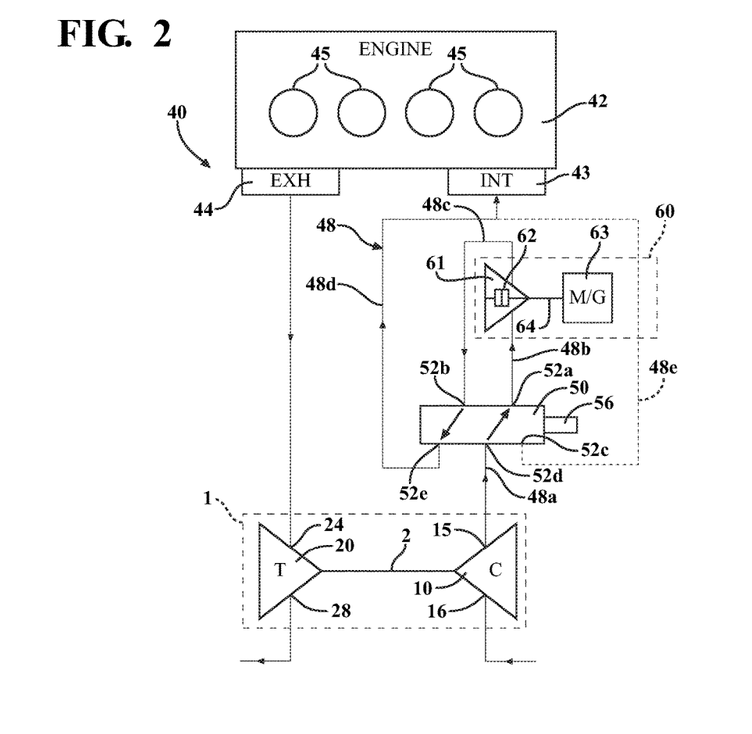
FIG. 2 is a schematic diagram of an engine system including an engine, the turbocharger of FIG. 1, a compressor-expander and a valve, and illustrating a first direction of charged air flow through the compressor-expander.
Figure 3:
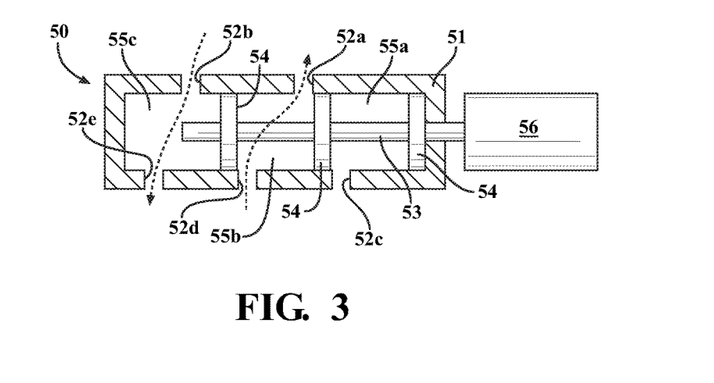
FIG. 3 is a cross-sectional view of the valve of FIG. 2 in a first operating state corresponding to the first direction of charged air flow through the compressor-expander.

Referring to FIGS. 2 and 3, the turbocharger 1 is part of an engine system 40. In use, the turbine wheel 30 in the turbine housing 22 is rotatably driven by an inflow of exhaust gas supplied from the exhaust manifold 44 of an engine 42. Since the turbocharger shaft 2 is rotatably supported in the bearing housing 8 and connects the turbine wheel 30 to the compressor impeller 14, the rotation of the turbine wheel 30 causes rotation of the compressor impeller 14 within the compressor cover 12. Rotation of the compressor impeller 14, increases the air mass flow rate, airflow density and air pressure delivered to the cylinders 45 of the engine 42 via an outflow of compressed air from the compressor air outlet 15, which is connected to the air intake manifold 43 of the engine 42 via an intake passage 48.

In addition to the engine 42 and turbocharger 1, the engine system 40 also includes a compressor-expander 60 configured to modify the pressure and temperature characteristics of the charged air flow exiting the turbocharger compressor section, and a valve 50 that controls the flow path and/or direction of the charged air flow as it enters the compressor-expander 60.

The compressor-expander 60 is disposed in the intake passage 48 between the compressor air outlet 15 and the air intake manifold 43. The compressor-expander 60 has two operating modes. In the first operating mode, the compressor-expander 60 operates as an expander to expand, and thus cool, the charged air exiting the compressor section 10. In the second operating mode, the compressor-expander 60 operates as a compressor to further compress the charged air exiting the compressor section 10. To these ends, the compressor-expander 60 includes a rotating electric machine 63 having an output shaft 64; a wheel 62 fixed to the output shaft 64, and a wheel housing 61 that encloses the wheel 62. The wheel housing 61 forms part of the air intake passage 48, and directs charged air to the wheel 62.

The valve 50 is an electromechanical reversing control valve that includes a valve housing 51, and a rod 53 having one end disposed in the valve housing 51 and an opposed end disposed outside the valve housing 51 and connected to a solenoid actuator 56. The rod 53 supports three axially spaced sealing partitions 54 that subdivide the interior space of the valve housing 51 into three chambers 55a, 55b, 55c. The size and axial location of the chambers 55a, 55b, 55c depends on the axial position of the rod 53 relative to the valve housing 51, which in turn is determined by the operating state of the solenoid actuator 56. The valve housing 51 includes a first port 52a and a second port 52b on one side of the valve housing 51, and three additional ports, e.g., a third port 52c, a fourth port 52d, and a fifth port 52e, on an opposed side of the valve housing 51. The ports 52a-52e are axially spaced apart, and the first and second ports 52a, 52b alternate with the third, fourth and fifth ports 52c, 52d, 52e along the axial direction.

The ports 52a-52e allow communication between the interior space of the valve housing 51 and a respective portion of the intake passage 48. In the illustrated embodiment, a first portion 48a of the intake passage 48 connects the air outlet 15 of the compressor section 10 to the fourth port 52d, a second portion 48b of the intake passage 48 connects the first port 52a to the wheel housing 61, and a third portion 48c of the intake passage 48 connects the wheel housing 61 to the second port 52b. In addition, a fourth portion 48d of the intake passage 48 connects the fifth port 52e to the engine air intake manifold 43, and a fifth portion 48e of the intake passage 48 connects the third port 52c to the engine air intake manifold 43.

Depending on the operating conditions of the engine 42, the valve 50 is used to control the direction of compressed air flow through the compressor-expander 60. For example, when the engine 42 is operating under low or mid-range loads, the valve 50 is set to a first operating state and directs the air flow through the compressor-expander 60 in a first direction. In these conditions, the compressor-expander 60 operates in the first operating mode whereby the air flow is expanded, and thus cooled, prior to reaching the engine air intake manifold 43. In addition, when the engine 42 is operating at high loads, the valve 50 is set to a second operating state and directs the air flow through the compressor-expander 60 in a second direction. In these conditions, the compressor-expander operates in the second operating mode whereby the air flow is additionally compressed prior to reaching the engine air intake manifold 43.

Details of the operation of valve 50 are as follows: when the solenoid actuator 56 of the valve 50 is in the first operating state, the rod 53 is in a first position relative to the valve housing 51; in this position, the first chamber 55a communicates with the third port 52c, the second chamber 55b communicates with both the first port 52a and the fourth port 52d, and the third chamber 55c communicates with the second port 52b and the fifth port 52e; as a result, air flow from the compressor section 10 passes through the first portion 48a of the air intake passage 48, through the second chamber 55b via the fourth and first ports 52d, 52a and to the wheel housing 61 via the second portion 48b of the air intake passage 48; the air flow passing through the wheel housing 61 is expanded, and exits the wheel housing 61 into the third portion 48c of the air intake passage 48; and the expanded air flow then passes through the third chamber 55c via the second and fifth ports 52b, 52e, and is directed to the engine air intake manifold 43 via the fourth portion 48d of the air intake passage 48.

Figure 4:
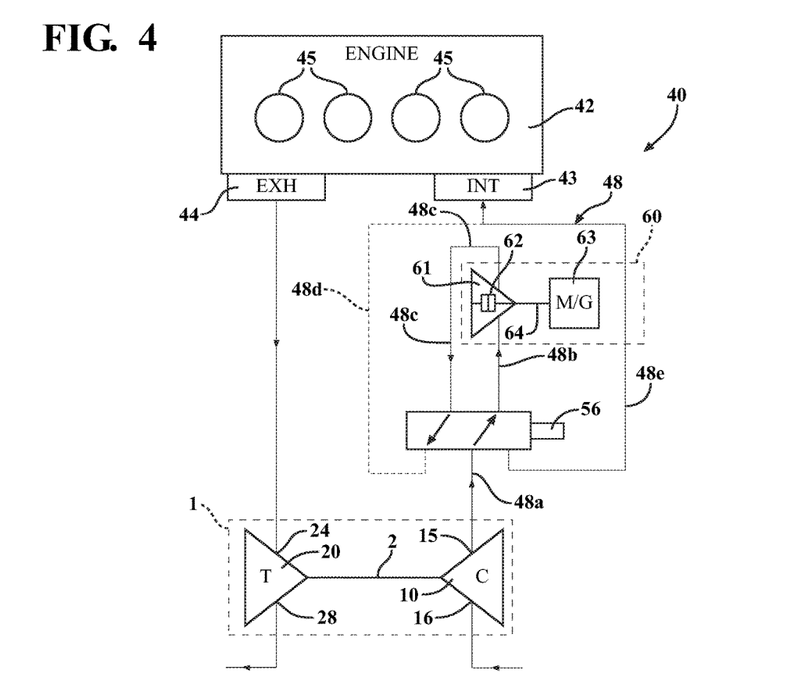
FIG. 4 is a schematic diagram of the engine system of FIG. 2, illustrating a second direction of charged air flow through the compressor-expander.
Figure 5:
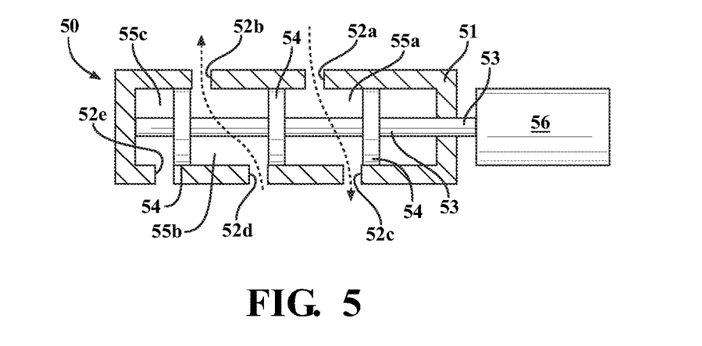
FIG. 5 is a cross-sectional view of the valve of FIG. 2 in a second operating state corresponding to the second direction of charged air flow through the compressor-expander.

Referring to FIGS. 4 and 5, when the solenoid actuator 56 of the valve 50 is in the second operating state, the rod 53 is in a second position relative to the valve housing 51. In this position, the first chamber 55a does not communicate with any port, the second chamber 55b communicates with both the first port 52a and the third port 52c, and the third chamber 55c communicates with the second port 52b and the fourth port 52d. As a result, air flow from the compressor section 10 passes through the first portion 48a of the air intake passage 48, through the through the third chamber 55c via the fourth and second ports 52d, 52b and to the wheel housing 61 via the third portion 48c of the air intake passage 48. The air flow passing through the wheel housing 61 is compressed, and exits the wheel housing 61 into the second portion 48b of the air intake passage 48. The compressed air flow then passes through the second chamber 55b via the first and third ports 52a, 52c, and is directed to the engine air intake manifold 43 via the fifth portion 48e of the air intake passage 48.

Figure 6:
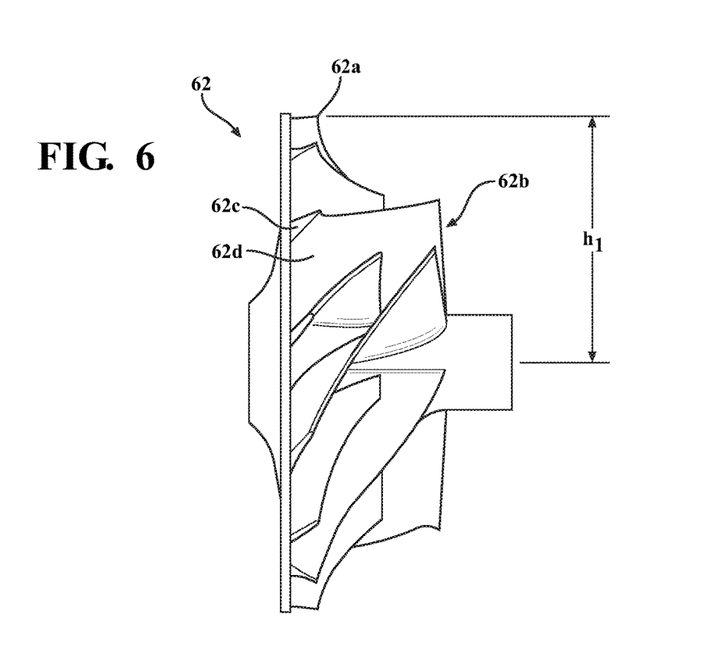
FIG. 6 is a side view of the wheel of the compressor-expander of FIG. 2.

Referring to FIG. 6, in the embodiment illustrated in FIGS. 2-5, the wheel 62 operates to both compress and expand air flow passing through the wheel housing 61. For this reason, the shape of the wheel 62 is optimized to optimize the wheel aerodynamic performance by adjustments to one or more features of the wheel 62. For example, one or more of angle and height h1 of the exducer tip 62a, the backsweep angle 62c of the blades 62d, the angle of the inducer leading edge 62b, or other aerodynamic features are optimized to provide suitable expansion and compression properties.

The wheel 62 is rotatably supported within the wheel housing 61 on the output shaft 64 of the rotating electric machine 63. When the valve 50 is in the first operating state and the compressor-expander 60 operates as an expander, the air flow through the wheel housing drives the wheel 62, and the rotating electric machine 63 operates as a generator. Thus, the work done on the wheel 62 by the air flow expansion is converted to electric power that can be stored or used by the vehicle in other ancillary systems. When the valve 50 is in the second operating state and the compressor-expander 60 operates as a compressor, the rotating electric machine 63 operates as a motor, and is used to drive the wheel 6 so as to further compress the air flow through the wheel housing 61.

Figure 7:
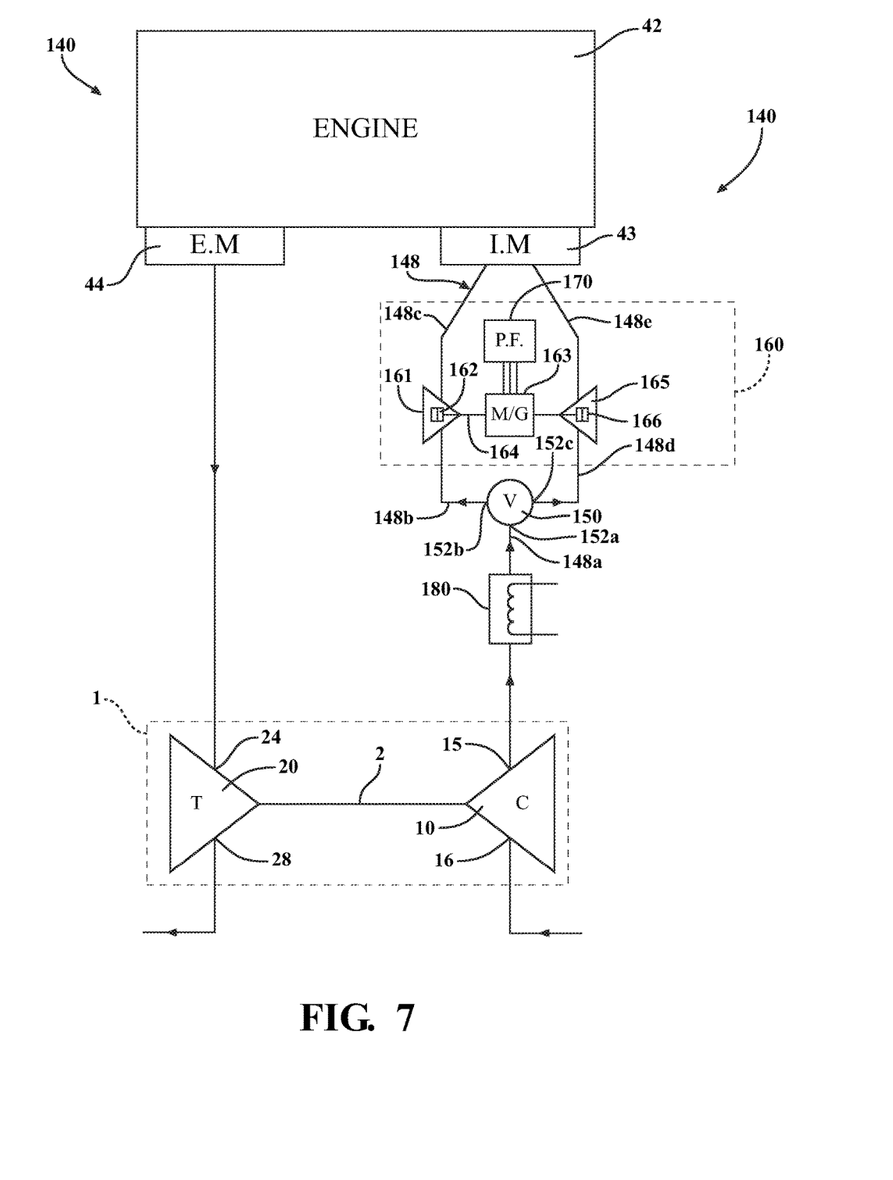
FIG. 7 is a schematic diagram of an alternative embodiment engine system including the engine, the turbocharger of FIG. 1, an alternative embodiment compressor-expander and an alternative embodiment valve.

Referring to FIG. 7, an alternative embodiment engine system 140 includes the engine 42, the turbocharger 1 configured to receive exhaust gas from, and provide charged air to, the engine 42, an alternative embodiment compressor-expander 160 configured to modify the pressure and temperature characteristics of the charged air flow exiting the turbocharger compressor section 10, and an alternative embodiment valve 150 that controls the flow path and/or direction of the charged air flow as it enters the compressor-expander 160.

The compressor-expander 160 is disposed in the intake passage 148 between the compressor air outlet 15 and the air intake manifold 43. The compressor-expander 160 has two operating modes. In the first operating mode, the compressor-expander 160 operates as an expander to expand, and thus cool, the charged air exiting the compressor section 10. In the second operating mode, the compressor-expander 160 operates as a compressor to further compress the charged air exiting the compressor section 10. To these ends, the compressor-expander 160 includes a rotating electric machine 163. The rotating electric machine 163 has an output shaft 164, and an expander wheel 162 is fixed to one end of the output shaft 164. An expander housing 161 encloses the expander wheel 162, forms part of the air intake passage 148, and directs charged air to the expander wheel 162. In addition, the compressor-expander 160 also includes a compressor wheel 166 that is fixed to an opposed end of the output shaft 164. A compressor housing 165 encloses the compressor wheel 166, forms part of the air intake passage 148, and directs charged air to the compressor wheel 166. A power electronics unit 170 controls the power and speed of the rotating electric machine 163.

The valve 150 is an electromechanical diverter valve that includes an inlet port 152a, a first outlet port 152b and a second outlet port 152c. The ports 152a-152c allow communication between the interior space of the valve housing and a respective portion 148a-e of the intake passage 148. In the illustrated embodiment, a first portion first portion 148a of the intake passage 148 connects the air outlet 15 of the compressor section 10 to the inlet port 152a, a second portion 148b of the intake passage 148 connects the first outlet port 152b to the expander housing 161, and a third portion 148c of the intake passage 148 connects the expander housing 161 to the engine air intake manifold 43. In addition, a fourth portion 148d of the intake passage 148 connects the second outlet port 152c to the compressor housing 165, and a fifth portion 148e of the intake passage 148 connects the compressor housing 165 to the engine air intake manifold 43. Thus, a first flow path through the compressor-expander 160 is defined by the first, second and third portions 148a, 148b, 148c of the intake passage 148, and a second flow path through the compressor-expander 160 is defined by the first, fourth and fifth portions 148a, 148d, 148e of the intake passage 148.

Depending on the operating conditions of the engine 42, the valve 150 controls which flow path through the compressor-expander 160 is used. For example, when the engine 42 is operating under low or mid-range loads, the valve 150 is set to a first operating state and directs the air flow through the compressor-expander 160 along the first flow path 148a, 148b, 148c. In these conditions, the compressor-expander 160 operates in the first operating mode whereby the air flow is expanded, and thus cooled, prior to reaching the engine air intake manifold 43. When air flow passes through the expander portion, the rotating electric machine 163 operates as a generator, and the work done on the expander wheel 162 by the air flow expansion is converted to electric power that can be stored or used by the vehicle in other ancillary systems. In addition, when the engine 42 is operating at high loads, the valve 150 is set to a second operating state and directs the air flow through the compressor-expander 160 along the second flow path 148a, 148d, 148e. In these conditions, the compressor-expander 160 operates in the second operating mode whereby the rotating electric machine 163 drives the compressor wheel 266 and the air flow is additionally compressed within the compressor housing 165 prior to reaching the engine air intake manifold.

The valve 150 is configured to seal off the unused portion of the compressor-expander 160 so that the unused portion of the compressor-expander 160 does not present a parasitic loss. That is, if the compressor-expander 160 is being used as an expander, the valve 150 will prevent air flow to the compressor housing 165, so that the compressor portion will perform negligible work. Likewise, if the compressor-expander 160 is being used as a compressor, the valve 150 will prevent air flow to the expander housing 161, so that the expander portion will perform negligible work.

Since the compressor-expander 160 includes both an expander wheel 162 and a compressor wheel 166, each respective wheel 162, 166 can have a shape optimized for its specific function, whereby the efficiency of both expansion and compression performed by the compressor-expander 160 can be improved relative to the embodiment shown in FIGS. 2-5.

Figure 8:
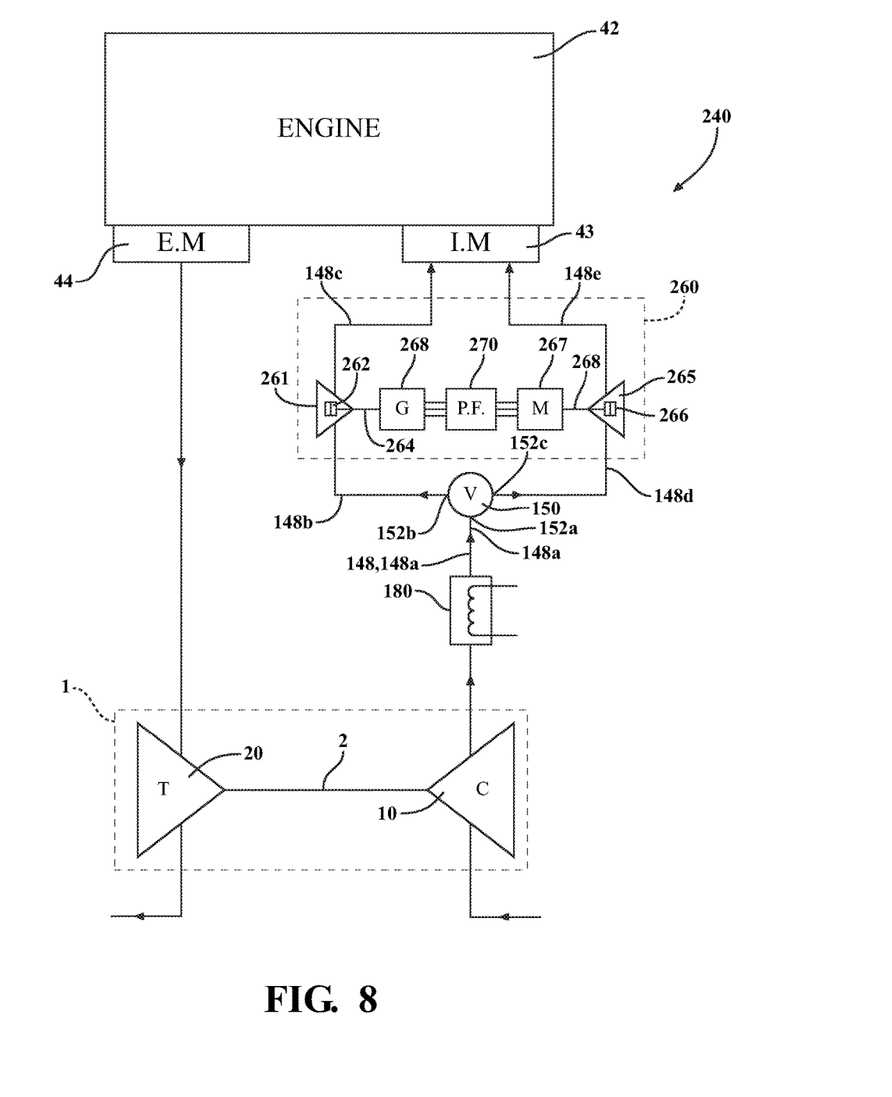
FIG. 8 is a schematic diagram of another alternative embodiment engine system including the engine, the turbocharger of FIG. 1, another alternative embodiment compressor-expander and the valve of FIG. 7.

Referring to FIG. 8, an alternative embodiment engine system 240 includes the engine 42, the turbocharger 1 configured to receive exhaust gas from, and provide charged air to, the engine 42, another alternative embodiment compressor-expander 260 configured to modify the pressure and temperature characteristics of the charged air flow exiting the turbocharger compressor section 10, and the diverter valve 150 that controls the flow path of the charged air flow as it enters the compressor-expander 260.

The compressor-expander 260 is disposed in the intake passage 148 between the compressor air outlet 15 and the air intake manifold 43. The compressor-expander 260 has two operating modes. In the first operating mode, the compressor-expander 260 operates as an expander to expand, and thus cool, the charged air exiting the turbocharger compressor section 10. In the second operating mode, the compressor-expander 260 operates as a compressor to further compress the charged air exiting the turbocharger compressor section 10. To these ends, the compressor-expander 260 includes a first rotating electric machine 263 in the form of a generator. The first rotating electric machine 263 has an output shaft 264; and an expander wheel 262 is fixed to the output shaft 264. An expander housing 261 encloses the expander wheel 262, forms part of the air intake passage 148, and directs charged air to the expander wheel 262. In addition, the compressor-expander 260 also includes a second rotating electric machine 267 in the form of a motor. The second rotating electric machine 267 has an output shaft 268; and a compressor wheel 266 is fixed to the output shaft 268. A compressor housing 265 encloses the compressor wheel 266, forms part of the air intake passage 148, and directs charged air to the compressor wheel 266. A power electronics unit 270 controls the power and speed of the first and second rotating electric machines 263, 267.

The valve 150 is described above with respect to FIG. 7. As previously described, the valve 150 controls whether air flow is directed to the compressor portion or the expander portion of the compressor-expander 260. In the embodiment illustrated in FIG. 8, a first portion 148a of the intake passage 148 connects the air outlet 15 of the compressor section 10 to the inlet port 152a, a second portion 148b of the intake passage 148 connects the first outlet port 152b to the expander housing 261, and a third portion 148c of the intake passage 148 connects the expander housing 261 to the engine air intake manifold 43. In addition, a fourth portion 148d of the intake passage 148 connects the second outlet port 152c to the compressor housing 265, and a fifth portion 148e of the intake passage 148 connects the compressor housing 265 to the engine air intake manifold 43. Thus, a first flow path through the compressor-expander 260 is defined by the first, second and third portions 148a, 148b, 148c of the intake passage 148, and a second flow path through the compressor-expander 160 is defined by the first, fourth and fifth portions 148a, 148d, 148e of the intake passage 148.

Depending on the operating conditions of the engine 42, the valve 150 controls which flow path through the compressor-expander 260 is used. For example, when the engine 42 is operating under low or mid-range loads, the valve 150 is set to a first operating state and directs the air flow through the compressor-expander 260 along the first flow path 148a, 148b, 148c. In these conditions, the compressor-expander 260 operates in the first operating mode whereby the air flow is expanded, and thus cooled, prior to reaching the engine air intake manifold 43. When air flow passes through the expander portion, the first rotating electric machine 263 operates as a generator, and the work done on the wheel expander wheel 262 by the air flow expansion is converted to electric power that can be stored or used by the vehicle in other ancillary systems. In addition, when the engine 42 is operating at high loads, the valve 150 is set to a second operating state and directs the air flow through the compressor-expander 260 along the second flow path 148a, 148d, 148e. In these conditions, the compressor-expander 260 operates in the second operating mode whereby the second rotating electric machine 267 drives the compressor wheel 266 and the air flow is additionally compressed within the compressor housing 265 prior to reaching the engine air intake manifold.

Since the expander wheel 262 is mounted to the output shaft 264 of the first rotating electric machine 263, and the compressor wheel 266 is mounted to the output shaft 268 of the second rotating electric machine 267, the compressor-expander 260 illustrated in FIG. 8 is more efficient than the compressor-expander 160 illustrated in FIG. 7, in which both wheels 162, 166 are mounted on a common shaft 164. Moreover, by providing an expander portion which is separate from the compressor portion, greater flexibility in packaging within a vehicle is provided, and the possibility of a parasitic loss being presented by the unused portion of the system is eliminated. However, these advantages must be weighed against the cost of a second rotating electric machine.

Figure 9:
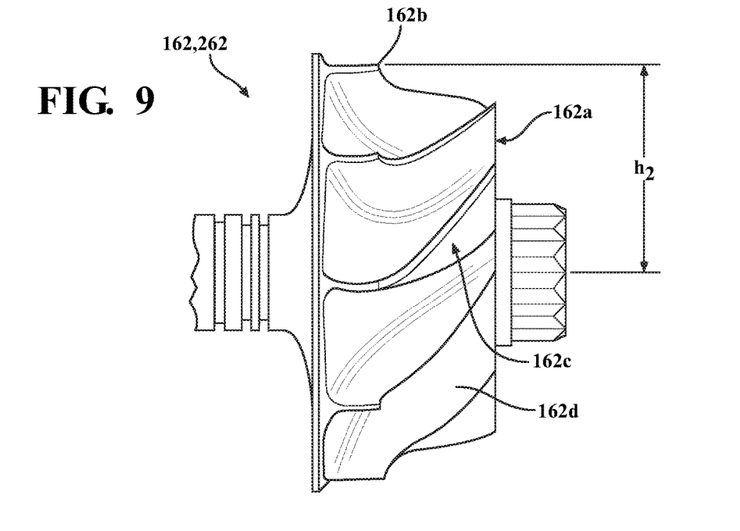
FIG. 9 is a side view of the expander wheel of the compressor-expanders of FIGS. 7 and 8.

Referring to FIG. 9, in some embodiments, the expander wheel 162, 262 may be shaped to develop work from a low temperature air flow stream relative to that of a conventional turbocharger turbine wheel. The pressure and expansion ratios required will be relatively small, for example in a range of 1.25-1.75. This enables the rotating electric machine 163, 263 to be relatively small and cost effective. The aerodynamic shape also ensures that the compressor-expander 160, 260 can operate at a speed which gives good power density but is within component limits associated with one or more of bearings, mechanical stress, electromagnetic considerations and/or electric switching devices. The rotating electric machine 163, 263 may operate in a speed range of 70 krpm-150 krpm, depending on the amount of air flow. Such operating conditions will require optimization of the shape of the expander wheel 162, 262. For example, one or more of angle and height h2 of the inducer tip 162b, the blade angle distribution 162c of the blades 162d, the profile of the exducer edge 162a, or other aerodynamic features are optimized to provide suitable expansion properties.

Figure 10:
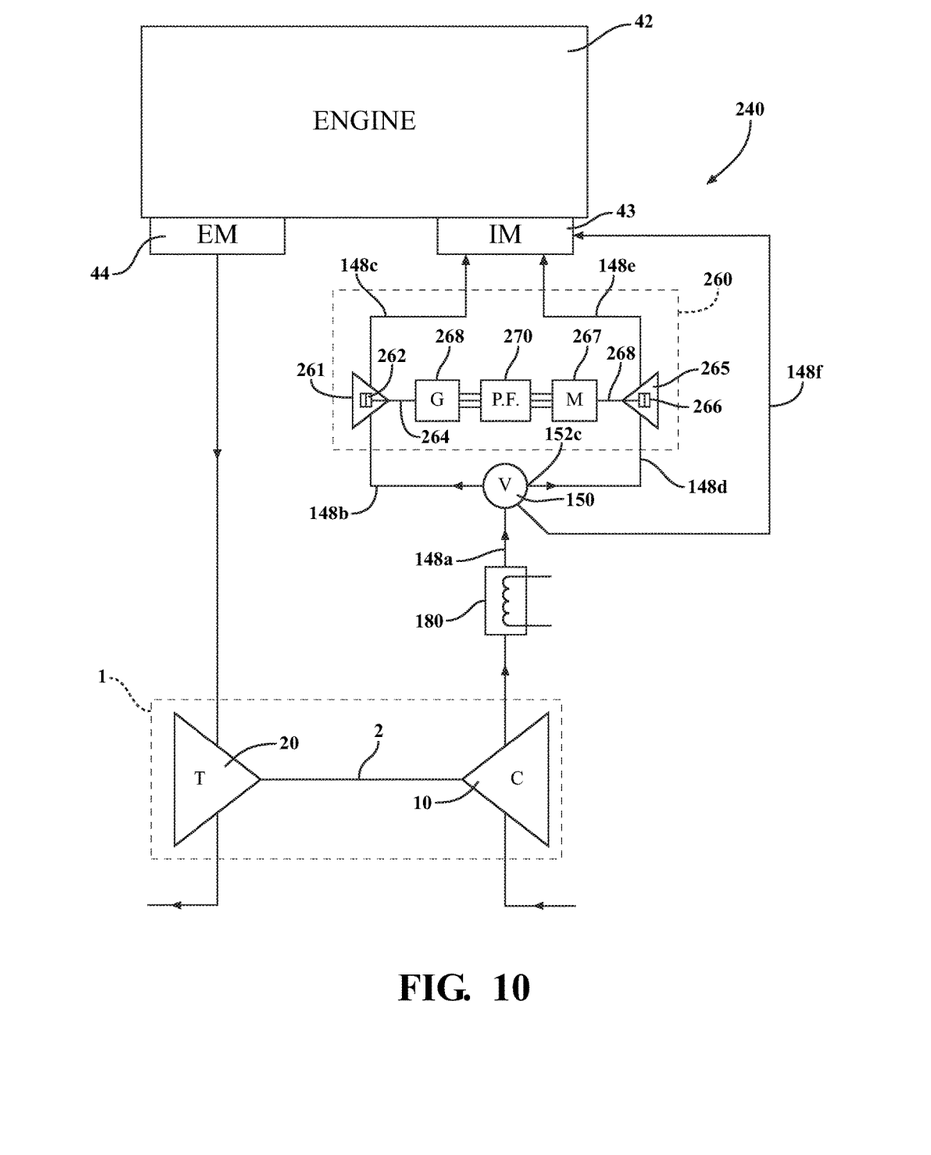
FIG. 10 is a schematic diagram of another alternative embodiment engine system including a bypass passage that bypasses the compressor-expander.

Referring to FIG. 10, in the exemplary engine systems 40, 140, 240 described herein, the valve 50, 150 is used to control the air flow to the compressor-expander 60, 160, 260 via a corresponding intake passage 48, 148. It is understood that the valve configurations and intake passage configurations described herein are non-limiting. For example, an engine system 240', which is otherwise similar to the engine system 240 described above with respect to FIG. 8, may further include an intake passage 148 having a bypass portion 148f that connects the valve 150 directly to the engine air intake manifold 43 and bypasses the compressor-expander 260. In FIG. 10, a bypass portion 148f is added to the engine system 240 illustrated in FIG. 8, but it is understood that such a bypass portion 148f could be implemented in any embodiment. The bypass portion 148f may be used when no expansion or compression of the air flow from the turbocharger compressor section 10 is required, thereby minimizing the efficiency penalty of implementing the compressor-expander 60, 160, 260.

An aftercooler 180 (FIGS. 7, 8 and 10) may optionally be disposed in the intake passage 48, 148 in order to provide cooling of the charged air exiting the turbocharger compressor section 10. For example, the aftercooler 180 may be disposed in the first portion 148a of the intake passage 48, 148 which connects the air outlet 15 of the compressor section 10 to the valve 50, 150.

Aspects of the disclosure have been described herein in an illustrative manner, and it is to be understood that the terminology used is intended to be in the nature of words of description rather than limitation. Many modifications and variations of the present disclosure are possible in light of the above teachings. It is, therefore, to be understood that within the scope of the appended claims, the disclosure may be practiced other than as specifically enumerated within the description.

What is claimed, is:

1. An engine system (40, 140, 240) comprising
    a turbocharger (1) including a turbine section (20) connected to an exhaust gas passage of an engine (42), and a compressor section (10) connected to an air intake passage (48, 148) of the engine (42);
    a compressor-expander (60, 160, 260), comprising a compressor wheel and an expander wheel disposed in the air intake passage (48, 148) at a location between the compressor section (10) and an air intake (43) of the engine (42), and
    a valve (50, 150) disposed in the air intake passage (48, 148) at a location between the compressor section (10) and the compressor-expander (60, 160, 260), the valve (50, 150) movable between a first valve operating state and a second valve operating state and configured to control air flow from the compressor section (10),
wherein the compressor-expander (60, 160, 260) is switchable between
    a first operating mode in which the valve (50, 150) is in a first operating state and the air flow passing through the compressor-expander (60, 160, 260) is expanded, and
    a second operating mode in which the valve (50, 150) is in the second operating state and the air flow through the compressor-expander (60, 160, 260) is compressed.

2. The engine system (40, 140, 240) of claim 1, wherein the compressor-expander (60, 160, 260) is switched to the first operating mode when the engine (42) is operating in a first power range, and is switched to the second operating mode when the engine (42) is operating in a second power range, where the second power range is higher than the first power range.

3. The engine system (40, 140, 240) of claim 1, wherein the compressor-expander (60, 160, 260) includes a housing (61, 161, 261) that defines a portion of the air intake passage (148), a wheel (62, 162, 262) disposed in the housing, and a rotating electric machine (63, 163, 263) having an output shaft (64, 164, 264) connected to the wheel (62, 162, 262).

4. The engine system (40) of claim 3 wherein the wheel (62) has a shape that is optimized for efficient performance of both compression and expansion.

5. The engine system (40) of claim 3, wherein the valve (50) is a reversing control valve operable to change a direction of the air flow through the housing (61), and when the valve (50) is in the first operating state, the air flow flows in a first direction, and when the valve (50) is in the second operating state, the air flow flows in a second direction that is opposed to the first direction.

6. The engine system (140, 240) of claim 3, wherein the valve (150) is operable to switch a flow of air between a first path through the compressor-expander (160, 260) in which the flow of air is expanded, and a second path through the compressor-expander (160, 260) in which the flow of air is compressed.

7. The engine system (40) of claim 3, wherein when the valve (50) is in the first operating state, the wheel (62) rotates in a first direction, and when the valve (50) is in the second operating state, the wheel (62) rotates in a second direction that is opposed to the first direction.

8. The engine system (140) of claim 1, wherein the compressor-expander (160) includes an expander device (161) including an expander wheel (162), a compressor device (165) including a compressor wheel (166), and a rotating electric machine (163) having an output shaft (164) connected to both the expander wheel (162) and the compressor wheel (166), wherein when the valve (150) is in the first operating state, the valve (150) directs the air flow to the expander device (161) via a first path, and when the valve (150) is in the second operating state, the valve (150) directs the air flow to the compressor device (165) via a second path.

9. The engine system (140) of claim 8, wherein the rotating electric machine (163) is operable as a motor and as a generator.

10. The engine system (240) of claim 1, wherein the compressor-expander (260) includes an expander device including an expander wheel (262), a compressor device including a compressor wheel (266), and a first rotating electric machine (263) operable as a generator and having a first output shaft (264) connected to the expander wheel (262), and a second rotating electrical machine (267) operable as a motor and having a second output shaft (268) connected to the compressor wheel (266), wherein when the valve (150) is in the first operating state, the valve (150) directs the air flow to the expander device via a first path, and when the valve (150) is in the second operating state, the valve (150) directs the air flow to the compressor device via a second path.

11. The engine system (40, 140, 240) of claim 1 further comprising an aftercooler (180) disposed in the air intake passage (48, 148) between the compressor section (10) and the valve (50, 150).

12. The engine system (40, 140, 240) of claim 1 further comprising a bypass passage (148*f*) that connects the valve (50, 150) to the engine air intake (43) and bypasses the compressor-expander (60, 160, 260).

* * * * *